Feb. 18, 1947.    A. WARMISHAM ET AL    2,416,033
OPTICAL OBJECTIVE
Filed June 12, 1943
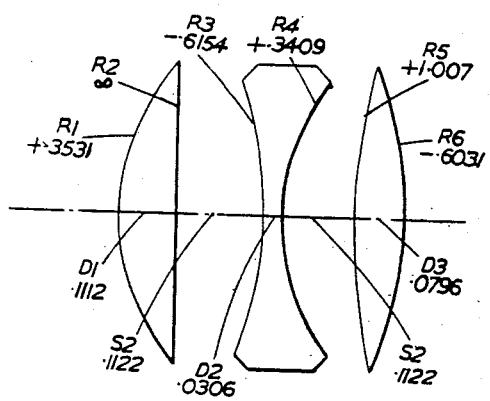
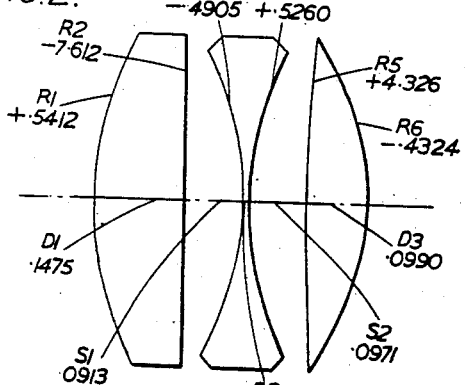
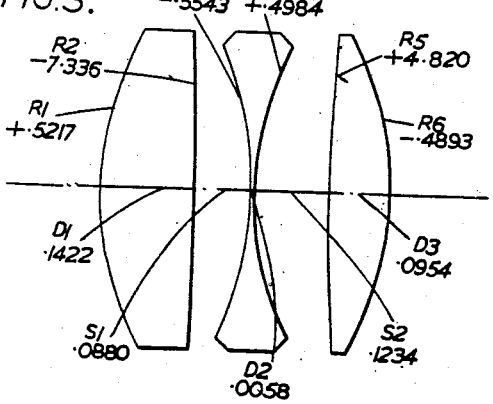
Inventors
A. Warmisham
By C. G. Wynne
Attorneys Patented Feb. 18, 1947

2,416,033

UNITED STATES PATENT OFFICE 2,416,033

OPTICAL OBJECTIVE

Arthur Warmisham and Charles Gorrie Wynne, Leicester, England

Application June 12, 1943, Serial No. 490,639
In Great Britain October 6, 1942

21 Claims. (Cl. 88—57)

This invention relates to an optical objective corrected for spherical and chromatic aberrations, coma, astigmatism, field curvature and distortion, and comprising a simple divergent component located between two simple convergent components, and has for its primary object to provide a higher aperture or a higher degree of correction than in existing objectives of this kind.

In the objective according to the invention the numerical sum of the radii of curvature of the front surface of the front component and of the rear surface of the rear component lies between 90% and 130% of the equivalent focal length of the objective, whilst the axial distance between such two surfaces lies between 40% and 50% of the equivalent focal length.

Conveniently at least one of the convergent outer components is made of a material having a mean refractive index between 1.70 and 1.80 and Abbé V number greater than 50.0 and preferably less than 58.0. The materials used for both outer components may have refractive index and Abbé V number within such limits, or alternatively one only may be within these limits the other conveniently having mean refractive index between 1.56 and 1.62 and Abbé V number between 55.0 and 61.0. Thus for example both outer components may be made of crystalline magnesium-oxide in the form known as β-magnesium-oxide, or one may be of magnesium-oxide crystal and the other of crown glass.

The divergent middle componet is preferably made of a material having mean refractive index between 1.64 and 1.75 and Abbé V number between 34.0 and 27.0, and, although dense flint glass may be used, it is especially convenient to make the middle component of an alkaline halide crystal, for example sodium bromide crystal.

By choosing materials for the three elements all having substantially the same relative partial dispersion, it is possible to obtain a much higher degree of correction for secondary spectrum than hitherto without sacrificing the corrections for astigmatism, field curvature and distortion. The relative partial dispersion, usually represented by $\theta$, may be defined by the mathematical expression $$\frac{n_g - n_e}{n_F - n_C}$$

where $n_C$, $n_e$, $n_F$ and $n_g$ are respectively the refractive indices for the spectrum lines C, e, F and g. Thus sodium bromide crystal has relative partial dispersion .985, and good secondary spectrum correction can be obtained with the use of this crystal for the divergent component in conjunction with magnesium-oxide crystal for the two convergent components, the relative partial dispersion of magnesium-oxide crystal being .989.

In the accompanying drawing,

Figures 1, 2 and 3 respectively illustrate three convenient practical examples of objective according to the invention.

Numerical data for the three examples are given in the following tables, in which $R_1$, $R_2$ ... represent the radii of curvature of the individual lens surfaces counting from the front (that is from the side of the longer conjugate) the positive sign indicating that the surface is convex to the front and the negative sign that it is concave thereto, $D_1$, $D_2$, $D_3$ represent the axial thicknesses of the individual elements, and $S_1$, $S_2$ represent the axial air spaces between the components. The tables also give the mean refractive indices $n_D$ for the D-line, the Abbé V numbers and the relative partial dispersions $\theta$ of the materials used for the various elements.

*Example I*

Equivalent focal length 1.000    Relative aperture F/2.5

| Radius | Thickness or air separation | Refractive index $n_D$ | Abbé V number | Relative partial dispersion |
|---|---|---|---|---|
| $R_1$+.3531 | $D_1$ .1112 | 1.574 | 57.3 | 1.006 |
| $R_2\infty$ | $S_1$ .1122 | | | |
| $R_3$−.6154 | $D_2$ .0306 | 1.652 | 33.5 | 1.060 |
| $R_4$+.3409 | $S_2$ .1122 | | | |
| $R_5$+1.007 | $D_3$ .0796 | 1.738 | 53.5 | .989 |
| $R_6$−.6031 | | | | |

*Example II*

Equivalent focal length 1.000    Relative aperture F/2.5

| Radius | Thickness or air separation | Refractive index $n_D$ | Abbé V number | Relative partial dispersion |
|---|---|---|---|---|
| $R_1$+.5412 | $D_1$ .1475 | 1.738 | 53.5 | .989 |
| $R_2$−7.612 | $S_1$ .0913 | | | |
| $R_3$−.4905 | $D_2$ .0076 | 1.675 | 32.2 | 1.063 |
| $R_4$+.5260 | $S_2$ .0971 | | | |
| $R_5$+4.326 | $D_3$ .0990 | 1.738 | 53.5 | .989 |
| $R_6$−.4324 | | | | |

Example III

Equivalent focal length 1.000   Relative aperture F/2.5

| Radius | Thickness or air separation | Refractive index $n_D$ | Abbé V number | Relative partial dispersion |
|---|---|---|---|---|
| $R_1+.5217$ | $D_1$ .1422 | 1.738 | 53.5 | 0.989 |
| $R_2-7.336$ | $S_1$ .0880 | | | |
| $R_3-.5543$ | $D_2$ .0058 | 1.641 | 30.0 | .985 |
| $R_4+.4984$ | $S_2$ .1234 | | | |
| $R_5+4.820$ | $D_3$ .0954 | 1.738 | 53.5 | .989 |
| $R_6-.4893$ | | | | |

In Example I the convergent rear component is made of magnesium oxide crystal and the convergent front component of crown glass, dense flint glass being used for the divergent middle component. In Examples II and III the convergent outer components are both made of magnesium oxide crystal, the divergent middle component being made of dense flint glass in Example II and of sodium bromide crystal in Example III.

The numerical sum of the radii $R_1$ and $R_6$ and the overall length of the objective are respectively .9562 and .4458 in Example I and .9736 and .4425 in Example II, and 1.0110 and .4548 in Example III.

Example III gives good correction for secondary spectrum and has the further advantage that it can be used not only with visible light but also over a wide range of the ultra violet down to 2000 Å. Since the relative partial dispersion of sodium bromide crystal used for the divergent component is slightly less than that of the magnesium oxide crystal used for the convergent components the combination gives a small residual secondary spectrum which is the reverse of the usual shape, for the paraxial focussing distance thereby established for the central wavelength chosen for colour correction is a maximum and other wavelengths but longer and shorter give smaller focussing distances. This is favourable for use with violet and ultraviolet rays, for as the wavelength decreases, the secondary spherical aberration becomes increasingly relatively overcorrected and the shortening of the paraxial focussing distance thus makes it possible to arrange a compromise such that the position of the focal plane can remain constant for all wavelengths with slightly softer definition for the shorter wavelengths.

What we claim as our invention and desire to secure by Letters Patent is:

1. An optical objective, corrected for spherical and chromatic aberrations, coma, astigmatism, field curvature and distortion, and comprising three simple components in axial alignment of which the front and rear components are convergent and the middle component divergent, the numerical sum of the radii of curvature of the front surface of the front component and the rear surface of the rear component lying between 90% and 130% of the equivalent focal length of the objective, whilst the axial distance between such two surfaces lies between 40% and 50% of such equivalent focal length.

2. An optical objective as claimed in claim 1, in which at least one of the convergent components is made of a material having mean refractive index between 1.70 and 1.80 and Abbé V number between 50.0 and 58.0.

3. An optical objective, corrected for spherical and chromatic aberrations, coma, astigmatism, field curvature and distortion, and comprising three simple components in axial alignment of which the front and rear components are convergent and the middle component divergent, the numerical sum of the radii of curvature of the front surface of the front component and the rear surface of the rear component lying between 90% and 130% of the equivalent focal length of the objective, whilst the axial distance between such two surfaces lies between 40% and 50% of such equivalent focal length, the two convergent components each being made of magnesium oxide crystal.

4. An optical objective, corrected for spherical and chromatic aberrations, coma, astigmatism, field curvature and distortion, and comprising three simple components in axial alignment of which the front and rear components are convergent and the middle component divergent, the numerical sum of the radii of curvature of the front surface of the front component and the rear surface of the rear component lying between 90% and 130% of the equivalent focal length of the objective, whilst the axial distance between such two surfaces lies between 40% and 50% of such equivalent focal length, one of the convergent components being made of a material having mean refractive index between 1.70 and 1.80 and Abbé V number greater than 50.0, whilst the other convergent component is made of a material having mean refractive index between 1.56 and 1.62 and Abbé V number between 55.0 and 61.0.

5. An optical objective as claimed in claim 1, in which the materials of which all three components are made have substantially the same relative partial dispersion.

6. An optical objective as claimed in claim 3, in which the materials of which all three components are made have substantially the same relative partial dispersion.

7. An optical objective as claimed in claim 1, in which the divergent middle component is made of a material having mean refractive index between 1.64 and 1.75 and Abbé V number between 34.0 and 27.0.

8. An optical objective as claimed in claim 3, in which the divergent middle component is made of a material having mean refractive index between 1.64 and 1.75 and Abbé V number between 34.0 and 27.0.

9. An optical objective as claimed in claim 4, in which the divergent middle component is made of a material having mean refractive index between 1.64 and 1.75 and Abbé V number between 34.0 and 27.0.

10. An optical objective as claimed in claim 1, in which the divergent middle component is made of an alkaline halide crystal.

11. An optical objective as claimed in claim 3, in which the divergent middle component is made of an alkaline halide crystal.

12. An optical objective as claimed in claim 1, in which the materials of which all three components are made have substantially the same relative partial dispersion, the divergent middle component being made of an alkaline halide crystal.

13. An optical objective as claimed in claim 1, in which the divergent middle component is made of a sodium bromide crystal.

14. An optical objective as claimed in claim 3, in which the divergent middle component is made of a sodium bromide crystal.

15. An optical objective as claimed in claim 1, in which dense flint glass is used for the divergent middle component.

16. An optical objective as claimed in claim 3, in which dense flint glass is used for the divergent middle component.

17. An optical objective as claimed in claim 4, in which dense flint glass is used for the divergent middle component.

18. An optical objective having numerical data substantially as set forth in the following table:

Equivalent focal length 1.000    Relative aperture F/2.5

| Radius | Thickness or air separation | Refractive index $n_D$ | Abbé V number | Relative partial dispersion |
|---|---|---|---|---|
| $R_1+ .3531$ | | | | |
| | $D_1$ .1112 | 1.574 | 57.3 | 1.006 |
| $R_2 \infty$ | | | | |
| | $S_1$ .1122 | | | |
| $R_3- .6154$ | | | | |
| | $D_2$ .0306 | 1.652 | 33.5 | 1.060 |
| $R_4+ .3409$ | | | | |
| | $S_2$ .1122 | | | |
| $R_5+1.007$ | | | | |
| | $D_3$ .0796 | 1.738 | 53.5 | .989 |
| $R_6- .6031$ | | | | | in which $R_1, R_2 \ldots$ represent the radii of curvature of the individual lens surfaces counting from the front (that is from the side of the longer conjugate) the positive sign indicating that the surface is convex to the front and the negative sign that it is concave thereto, $D_1, D_2, D_3$ represent the axial thicknesses of the individual elements, and $S_1, S_2$ represent the axial air spaces between the components.

19. An optical objective having numerical data substantially as set forth in the following table:

Equivalent focal length 1.000    Relative aperture F/2.5

| Radius | Thickness or air separation | Refractive index $n_D$ | Abbé V number | Relative partial dispersion |
|---|---|---|---|---|
| $R_1+ .5412$ | | | | |
| | $D_1$ .1475 | 1.738 | 53.5 | 0.989 |
| $R_2-7.612$ | | | | |
| | $S_1$ .0913 | | | |
| $R_3- .4905$ | | | | |
| | $D_2$ .0076 | 1.675 | 32.2 | 1.063 |
| $R_4+ .5260$ | | | | |
| | $S_2$ .0971 | | | |
| $R_5+4.326$ | | | | |
| | $D_3$ .0990 | 1.738 | 53.5 | .989 |
| $R_6- .4324$ | | | | | in which $R_1, R_2 \ldots$ represent the radii of curvature of the individual lens surfaces counting from the front (that is from the side of the longer conjugate) the positive sign indicating that the surface is convex to the front and the negative sign that it is concave thereto, $D_1, D_2, D_3$ represent the axial thicknesses of the individual elements, and $S_1, S_2$ represent the axial air spaces between the components.

20. An optical objective having numerical data substantially as set forth in the following table:

Equivalent focal length 1.000    Relative aperture F/2.5

| Radius | Thickness or air separation | Refractive index $n_D$ | Abbé V number | Relative partial dispersion |
|---|---|---|---|---|
| $R_1+ .5217$ | | | | |
| | $D_1$ .1422 | 1.738 | 53.5 | 0.989 |
| $R_2-7.336$ | | | | |
| | $S_1$ .0880 | | | |
| $R_3- .5543$ | | | | |
| | $D_2$ .0058 | 1.641 | 30.0 | .985 |
| $R_4+ .4984$ | | | | |
| | $S_2$ .1234 | | | |
| $R_5+4.820$ | | | | |
| | $D_3$ .0954 | 1.738 | 53.5 | .989 |
| $R_6- .4893$ | | | | | in which $R_1, R_2 \ldots$ represent the radii of curvature of the individual lens surfaces counting from the front (that is from the side of the longer conjugate) the positive sign indicating that the surface is convex to the front and the negative sign that it is concave thereto, $D_1, D_2, D_3$ represent the axial thicknesses of the individual elements, and $S_1, S_2$ represent the axial air spaces between the components.

21. An optical objective, corrected for spherical and chromatic aberrations, coma, astigmatism, field curvature and distortion, and comprising three simple components in axial alignment of which the front and rear components are convergent and the middle component divergent, the numerical sum of the radii of curvature of the front surface of the front component and the rear surface of the rear component lying between 90% and 130% of the equivalent focal length of the objective, while the axial distance between such two surfaces lies between 40% and 50% of such equivalent focal length in which at least one of the convergent components is made of a material having mean refractive index between 1.70 and 1.80 and Abbé V number between 50.0 and 58.0, and the divergent middle component is made of a material having mean refractive index between 1.64 and 1.75 and Abbé V number between 34.0 and 27.0.

ARTHUR WARMISHAM.
CHARLES GORRIE WYNNE.

REFERENCES CITED

The following references are of record in the file of this patent:

UNITED STATES PATENTS

| Number | Name | Date |
|---|---|---|
| 1,987,878 | Tronnier | Jan. 15, 1935 |
| 1,892,162 | Richter | Dec. 27, 1932 |
| 2,279,372 | Herzberger | Apr. 14, 1942 |
| 2,085,437 | Michelssen | June 29, 1937 |
| 1,541,407 | Spannenberg | June 9, 1925 |
| 1,035,408 | Beck et al. | Aug. 13, 1912 |
| 1,073,789 | Wandersleb | Sept. 23, 1913 |
| 2,298,090 | Warmisham | Oct. 6, 1942 |